(No Model.) 2 Sheets—Sheet 1.

J. A. DEMUTH.
TALLYING APPARATUS FOR GRAIN HOPPERS.

No. 398,821. Patented Mar. 5, 1889.

WITNESSES.
N. S. Armstutz
L. L. Clizbe

John A Demuth
INVENTOR.
By
Liggett & Liggett Attorneys.

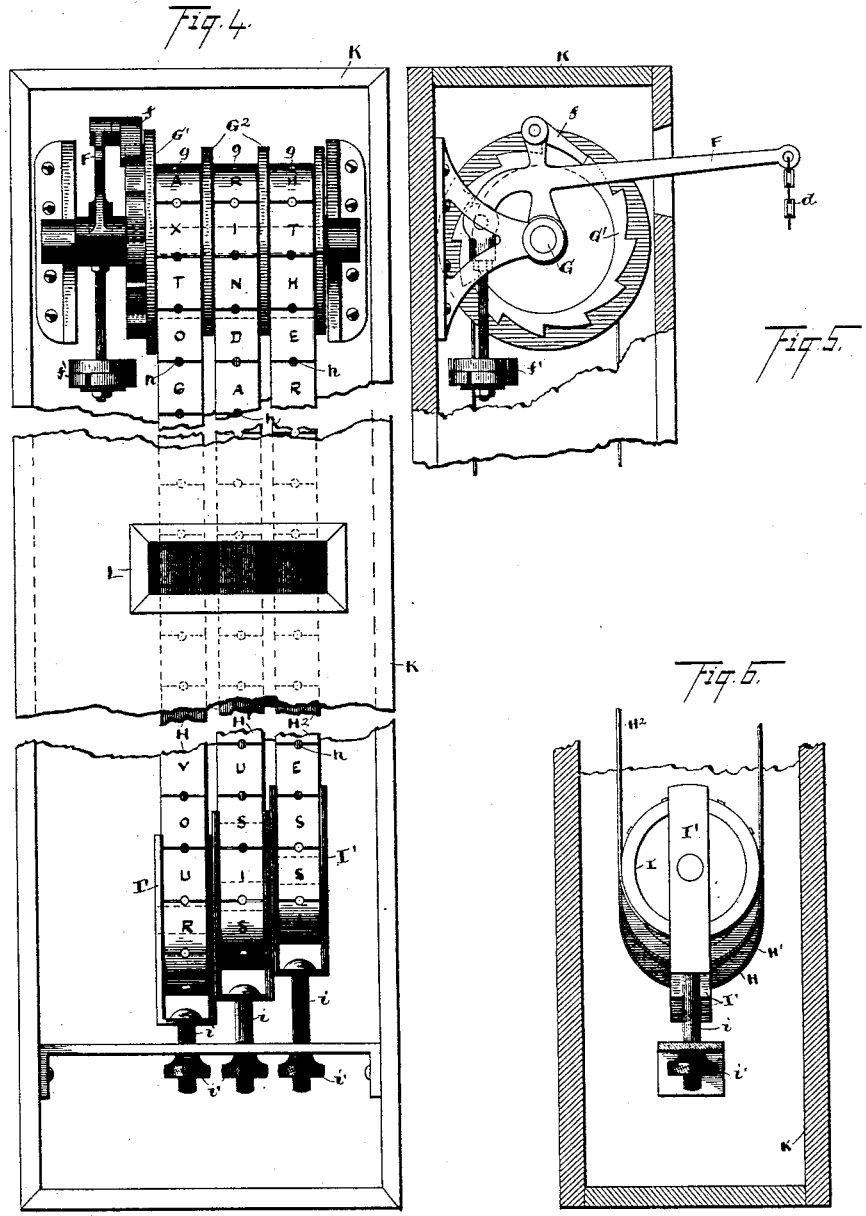

UNITED STATES PATENT OFFICE.

JOHN A. DEMUTH, OF TOLEDO, OHIO.

TALLYING APPARATUS FOR GRAIN-HOPPERS.

SPECIFICATION forming part of Letters Patent No. 398,821, dated March 5, 1889.

Application filed May 31, 1888. Serial No. 275,609. (No model.)

*To all whom it may concern:*

Be it known that I, JOHN A. DEMUTH, of Toledo, in the county of Lucas and State of Ohio, have invented certain new and useful Improvements in Registering or Tallying Apparatus for Weighing Grain; and I do hereby declare the following to be a full, clear, and exact description of the invention, such as will enable others skilled in the art to which it pertains to make and use the same.

My invention relates to a registering or tallying apparatus for weighing grain, in which a suitable casing is secured inside the grain-hopper, such casing having a movable false bottom that is depressed by the weight of grain thereon in filling the grain-hopper, said false bottom being elevated to its normal position by a spring or counter-balance when by the discharge of grain from the hopper such false bottom is relieved from the weight of grain thereon. The false bottom is operatively connected with a lever and pawl for actuating a ratchet-wheel, whereby a sprocket-drum is rotated one notch of the ratchet-wheel at a time. There are three belts operating on the sprocket-drum, and these belts are of unequal length and are respectively divided by means of the holes in the belts for engaging the sprockets of the drum into spaces corresponding with the notches of the ratchet-wheel. Each space of the respective belts is lettered, such letters occurring without alphabetical order and such promiscuous lettering being different on the different belts. The belts and connected mechanism are inclosed in a suitable casing, such casing having a sight hole or slot that exposes one letter of each belt at a time. Different combinations of letters are successively brought before the sight-hole with each filling of the weighing-hopper. When the shipping-order is filled, such shipping-order and the tally-slip of the weighman are returned to the office, the tally-slip or the weighing-order having marked thereon the letters exposed at the sight-hole at the end of the weighing. The accountant in the office, by means of a suitable key, can at a glance see whether the tally of the weighman is correct or not, and if found to be incorrect can ascertain at once whether the tally is too great or too small and the amount of such error in the tally.

Figure 1:
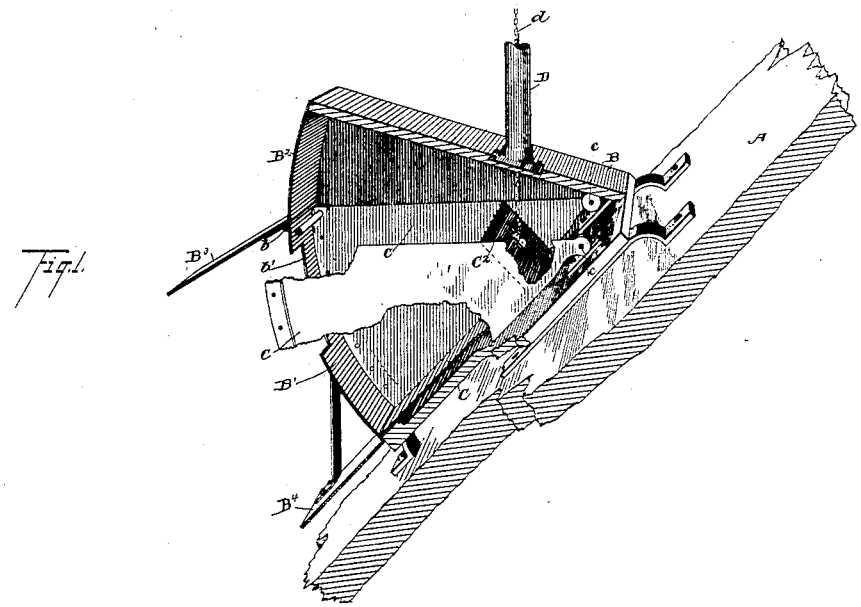
Figure 2:
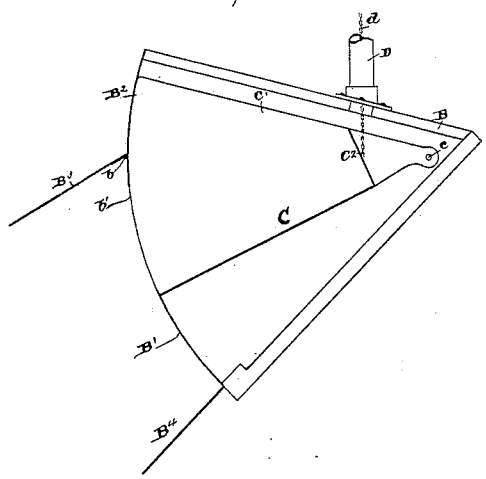
Figure 3:
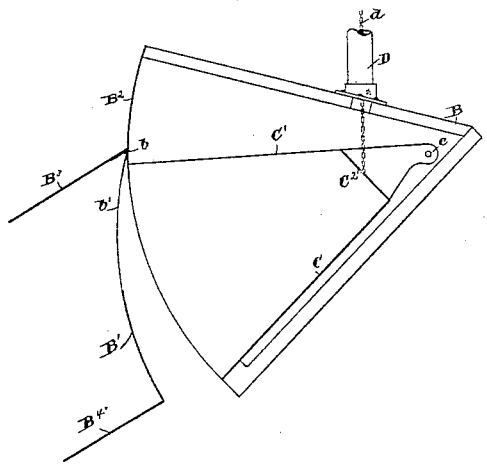

In the accompanying drawings, Figure 1 is a view in perspective, portions being broken away to show the construction. Figs. 2 and 3 are diagrammatic views showing different positions of the parts. Fig. 4 is a front elevation of the registering device; and Figs. 5 and 6 are side elevations, respectively, of the upper and lower portions thereof. In these three figures portions are broken away to show the construction.

A represents one of the sloping sides of the hopper, in which the grain is weighed, and to the inner surface of which is permanently secured casing B. Inside the casing operates a false bottom, C, the latter being pivoted at $c$ to the casing or to an attachment thereof. The one side of the casing is concentric with the pivotal axis $c$ of the false bottom, the lower section of such curved side $B'$ being hinged at $b$ to the upper section, $B^2$, the movable section or door $B'$ having an opening, $b'$, of considerable size and located about midway vertically of the entire circular side of the casing, as shown in Fig. 1. The free end of the false bottom fits as close as may be without rubbing to the circular side of the casing when the door is closed.

Joined to bottom C are side pieces, $C'$, the latter being of such width that they extend above opening $b'$ when the false bottom is in its depressed position. (See Fig. 3.) Bottom C, when elevated, comes close to the lower side of opening $b'$. A transverse head, $C^2$, joins bottom C and sides $C'$, and connected with this head is chain $d$, the latter leading up through tube D and connecting with the registering device hereinafter described. Tube D extends so far upward that no grain can enter the casing through this tube.

$B^3$ and $B^4$ are shelves, the former being secured to the casing just above the door, and the latter being connected with the door near the lower side of the latter. The weight of shelf $B^4$ causes door $B'$ to gravitate approximately to the closed position. (Shown in Figs. 1 and 2.) In filling the hopper with grain, shelf $B^3$ prevents any grain from entering hole $b'$ until the grain has accumulated in the hopper and is banked up on shelf $B^4$ and against the lower portion of the door, so that when the grain reaches and flows through opening $b'$ onto the false bottom the door, by means of the grain outside thereof, is held closed. When a sufficient quantity of grain has accumulated on the bottom C, the latter is depressed thereby to the position shown in Figs. 1 and 3. When the grain is discharged from the hopper, the door swings open from the pressure of grain within the casing and allows the inclosed grain to flow out of the casing and from off bottom C, whereupon the false bottom, by means of a spring or counterbalance hereinafter shown, rises to its normal position. (Shown in Fig. 2.) Chain $d$, or whatever connecting mechanism may be employed for the purpose, leads to lever F. This lever is provided with pawl $f$ for engaging ratchet-wheel G′, and from the short end of the lever may be suspended poise $f'$ for elevating the long arm of the lever and the false bottom C. With such arrangement of parts the ratchet-wheel is rotated one notch every time the grain-hopper is filled, and the pawl is drawn back one notch when the grain is discharged from the hopper, and the parts being inclosed there is no means by which the mechanism can be actuated by accident or otherwise. A spring connected with lever F, or with any portion of the chain, could be made to answer the purpose just as well as the poise shown. Lever F is pivoted on shaft G, and on this shaft is mounted the ratchet-wheel G′ and sprocket-wheel G². The latter wheel, or "drum," as it is more commonly called, has three circumferential series of sprockets, $g$, the sprocket of each series corresponding in number with the notches of the ratchet-wheel. Belts H, H′, and H², preferably of metal, are arranged in the order shown on the drum, each belt having holes $h$ for engaging the sprockets. The longitudinal spaces of the belts between holes $h$ are lettered promiscuously—that is, without regard to alphabetical order—and the arrangement of letters is different on the different belts. Each belt runs on an idle-pulley, I, the trunnions of each idle-pulley being journaled, respectively, in a yoke, I′.

Each yoke is provided with a screw-rod and thumb-nut respectively, $i$ and $i'$, for tightening the belts. The belts, as shown, are of unequal length, the intermediate belt in length having at least one lettered space more than the shortest belt, and having at least one lettered space less than the longest belt, by means of which, as these belts are actuated by the sprocket-drum, different combinations of letters, read crosswise of the belts, are successively presented.

The register is inclosed in casing K, and the latter has a slit or sight-hole, L, extending crosswise the three belts and wide enough to expose one letter of each belt, and located vertically in such position as to expose the letters when the belts are at rest—that is to say, between the strokes of the pawl. In place of slot L of course three small sight-holes might be made, one for each belt, if there were any advantage to be gained by such construction. With the arrangement of mechanism shown it is evident that for every time the grain-hopper is filled and discharged of grain the series of belts will be advanced each one lettered space. It is also evident that with the promiscuous lettering and different lengths of the belts the weighman cannot possibly anticipate the letters that will be next exposed, or that will be exposed after the ratchet-wheel has been turned a given number of notches, and if the weighman should watch the letters as they appear at the sight-hole until doomsday he could not get the slightest clue as to what letters would next be exposed. The weighman keeps his tally in the usual manner, either on a tally-slip or on the shipping-order and returns to the office his tally-slip and shipping-order, together with a transcript of the letters at the sight-hole at the end of such weighing. At the office is kept a key, by means of which is readily ascertained whether the tally is or is not correct, and if the tally is found incorrect how to correct the error.

The key is not shown, but will be readily understood without drawings, to wit: Suppose duplicate belts were severed on a given line, and these belts were stretched out on a board or table side by side with pegs for counting, such pegs being inserted in holes $h$. This would constitute a suitable key. In practice usually a strip of wood is lined off lengthwise to represent the three belts, and is lined off crosswise to represent the divisions of each belt, with holes in each space for pegging, and the different spaces lettered the same as on the belt. Two pegs for each belt should be employed, and the pegging or counting is done substantially as on a cribbage-board. Suppose the capacity of the grain-hopper to be one hundred bushels and the scales are set accordingly, and that the weighman receives a shipping-order for fifteen hundred bushels, and that before commencing to weigh on this order the letters exposed at slit L were X, J, and T, as shown at the sight-hole in Fig. 4, in which case the advanced pegs on the key would represent these letters, the pegs having been left in such position after the last order was weighed. The accountant leaves the advanced pegs in their place, still representing letters X, J, and T, and with other pegs counts off fifteen spaces on each belt and inserts the different pegs accordingly. Suppose the fifteenth space on the different belts shows letters X I T, as they occur near the top in Fig. 4. Now if the weighman has tallied fifteen hopperfuls and has returned letters X I T to the office it is evident that his tally is correct; but suppose the weighman should return letters A R H, in which case it would be evident that he had omitted one tally and had weighed one hopperful too much. On the other hand, suppose the weighman returns letters T N H. This would show conclusively that he had only weighed fourteen hopperfuls and had inadvertently tallied one hopper twice. We have, then, what might be called a system of double entry for the weighing-tallies, by means of which it would be impossible to make a mistake in the tally without such mistake being detected at once and corrected.

What I claim is—

1. In a registering apparatus for measuring grain, the combination, with a sprocket-drum and ratchet-wheel, pawl, and lever for intermittently rotating the drum, of endless belts of different lengths operating upon the sprocket-drum, these belts being lettered, and a casing inclosing the belts, such casing having a sight-hole through which one letter of each belt may be read at a time, substantially as set forth.

2. In a registering apparatus for measuring grain, the combination, with a motor consisting, essentially, of a casing located inside a hopper, such casing having a depressible false bottom and induction and eduction openings, of a sprocket-drum, ratchet-wheel, pawl, and lever for intermittently rotating the drum, endless belts of different lengths operating on the drum, and a flexible connection between the depressible false bottom of the casing and the lever, substantially as set forth.

3. In registering apparatus for weighing grain, the combination, with a sprocket-drum and ratchet-wheel, pawl, and lever for intermittingly rotating the drum, substantially as indicated, of belts, preferably of metal, and operating upon the sprocket-drum, the different belts having unequal numbers of equal spaces, the spaces of each belt being lettered without alphabetical order, the letters being placed in different relations on the different belts, and a casing inclosing the belts, such casing having a sight-hole through which one letter of each belt may be read, the relation of parts being such that the lettered spaces of the belt are successively brought before the sight-hole with each stroke of the ratchet, lever, and pawl, substantially as set forth.

In testimony whereof I sign this specification, in the presence of two witnesses, this 23d day of February, 1888.

JOHN A. DEMUTH.

Witnesses:
 LOUIS KRIEGER,
 CHALMERS BLAIR.